United States Patent [19]
Lehmann

[11] 3,712,653
[45] Jan. 23, 1973

[54] ECCENTRIC-ACTUATED HOOK-TYPE FASTENING DEVICE

[75] Inventor: Kenneth G. Lehmann, Easton, Conn.

[73] Assignee: Norco, Inc., Town of Ridgefield, County of Fairfield, Conn.

[22] Filed: May 10, 1971

[21] Appl. No.: 141,844

[52] U.S. Cl..............................287/20.924, 292/111
[51] Int. Cl....................................................F16b 5/00
[58] Field of Search.......287/20.924, 20.925, 20.926, 287/20.927; 292/111; 52/584, 585

[56] References Cited

UNITED STATES PATENTS

| | | | |
|---|---|---|---|
| 3,565,469 | 2/1971 | Zwart | 287/20.924 |
| 3,528,690 | 9/1970 | Langer | 287/20.927 |
| 3,061,347 | 10/1962 | Schleuter | 292/111 |
| 3,191,244 | 6/1965 | Burke | 287/20.924 |

FOREIGN PATENTS OR APPLICATIONS

| | | | |
|---|---|---|---|
| 562,189 | 11/1957 | Belgium | 292/111 |

*Primary Examiner*—David J. Williamowsky
*Assistant Examiner*—Wayne L. Shedd
*Attorney*—H. Gibner Lehmann

[57] ABSTRACT

A fastening device for securing together two adjoining structures, such as two building or wall panels which have adjoining edges abutting each other. In the adjoining edges the panels are provided with recesses, one of which has a cross bar constituting a part of the fastening means. In the other recess there is movably carried a hook adapted to extend across the juncture of the panels for engagement with the cross bar to latch onto the same. The swivel portion of the hook is formed in the shape of a large eye or bearing ring, in which there is located an operating disk having bearings in the opposite side walls of the recess which carries the hook. The disk is eccentrically mounted in such a manner that when it turns it will effect an advancing and retracting movement of the hook, and will also effect a rotary movement or excursion of the hook into or out of the adjoining recess of the other panel. The eccentric disk is of molded plastic and has an integral flange constituting a track and stop shoulder formation which is engageable with portions of the hook to effect the proper movements and positioning of the latter The molded disk has means engageable by a tool, such as a square or hexagonal section key, for the purpose of turning the disk so as to operate the hook for fastening or unfastening the panels.

8 Claims, 19 Drawing Figures

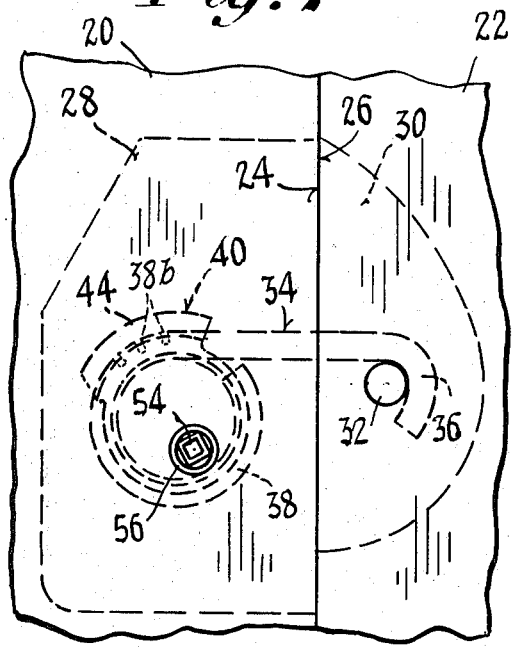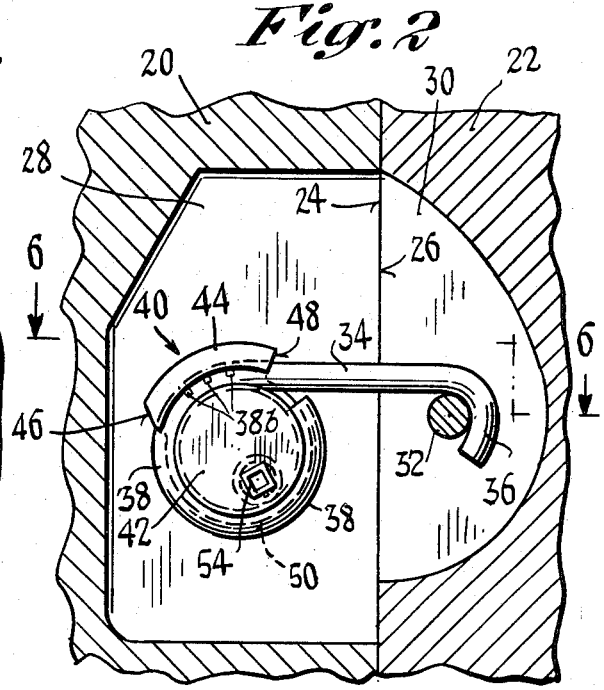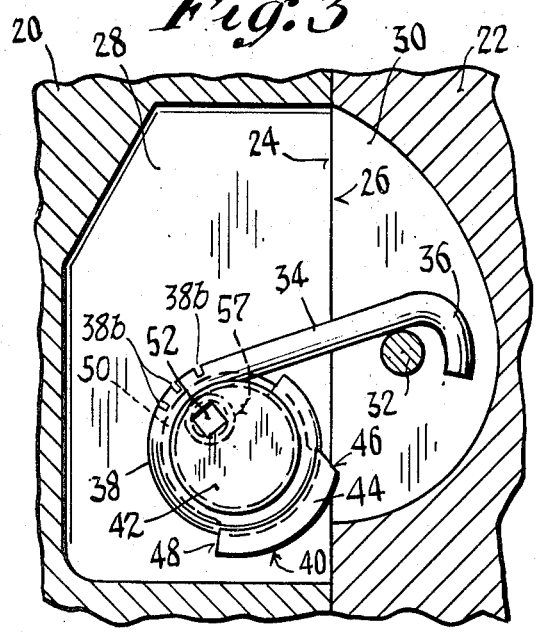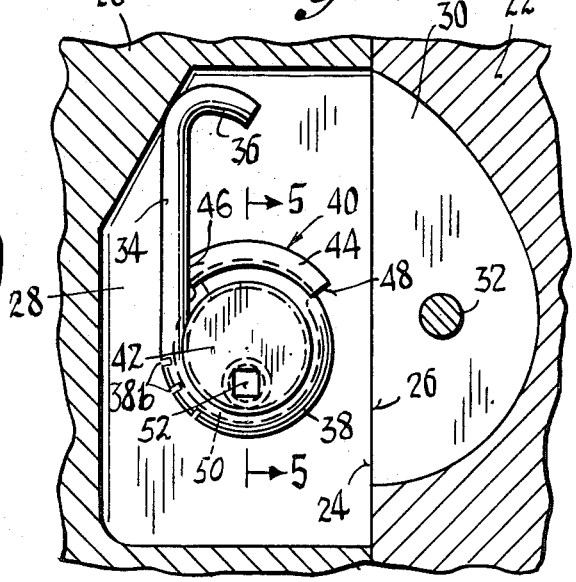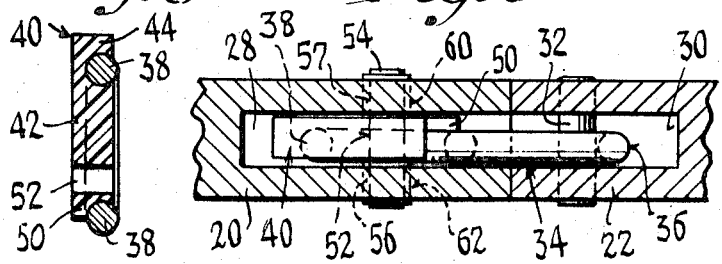

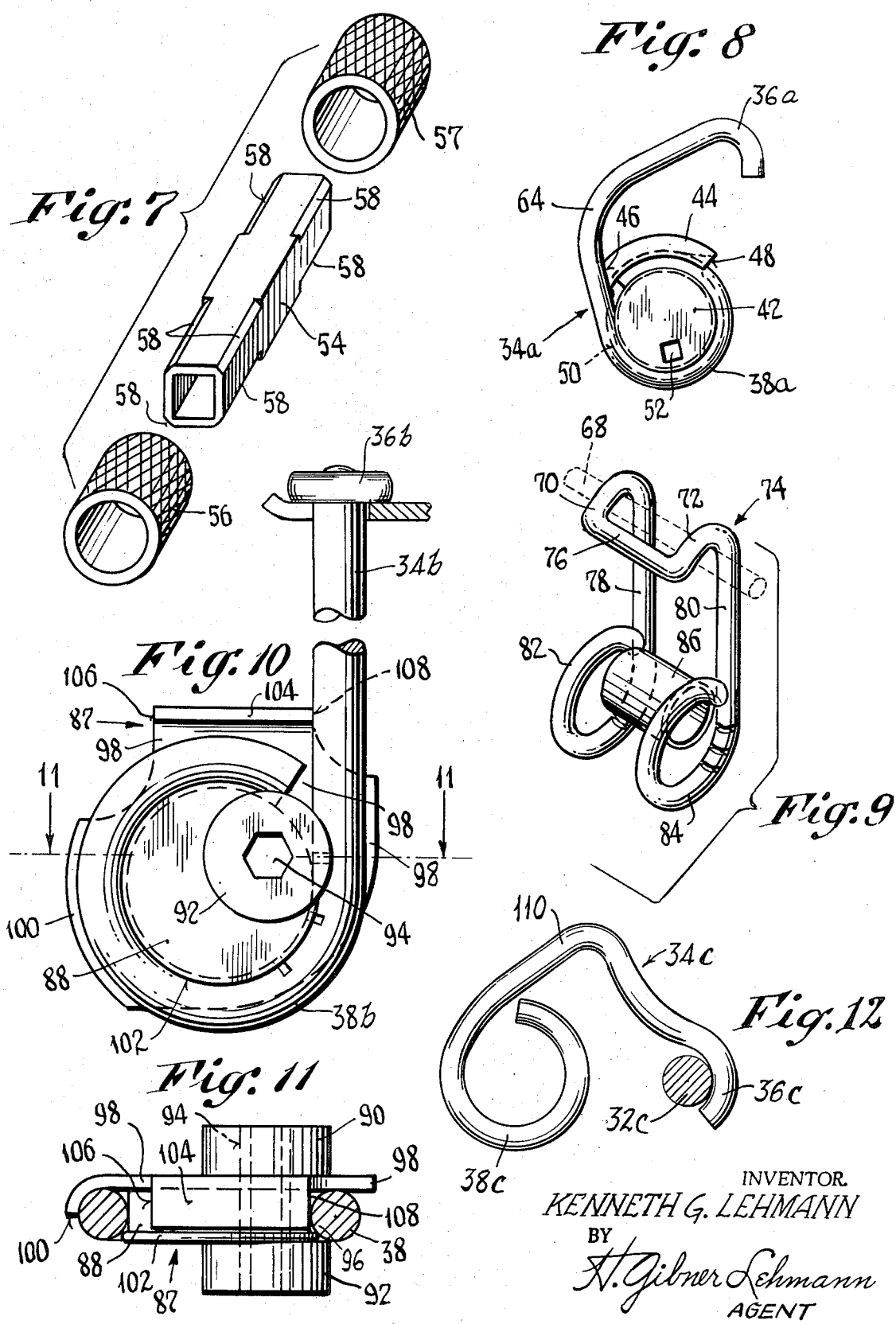

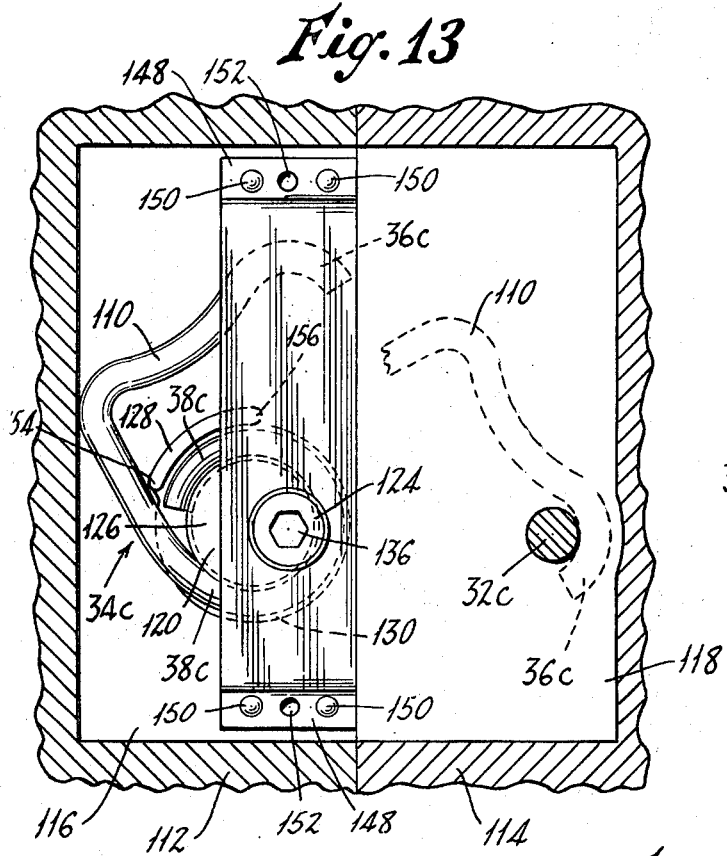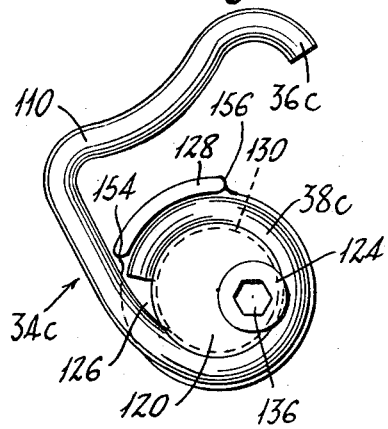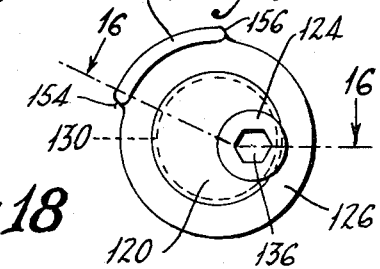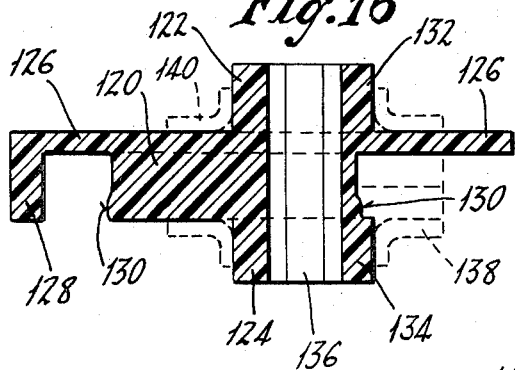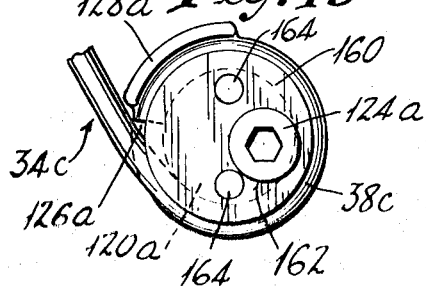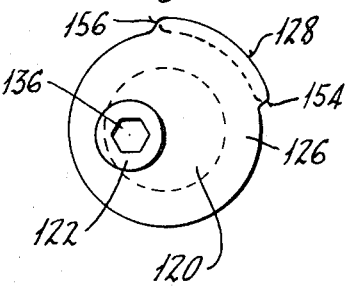

ECCENTRIC-ACTUATED HOOK-TYPE FASTENING DEVICE

BACKGROUND

This invention relates to eccentric-actuated fastening devices, and more particularly to devices of this type comprising hook members adapted to be swung between inoperative and operative positions and also between extended and retraced positions, all for the purpose of engaging or disengaging a cross bar of a cooperable member. In the past various types of fastening devices of this nature have been proposed and produced, involving either single, S-shaped hooks and multi-part eccentric, guide and stop means or else generally U-shaped fastening formations the end portions of which have S-shapes. In each such prior instance, the S-shaped hook member is carried by an eccentrically mounted disk or cam. The eccentric assemblages constituted separate wheel or disk members and also sheet metal guides incorporating stop shoulders, by which the desired action was obtained to manipulate the hook in response to turning of an operating shaft.

While these prior devices operated in some cases satisfactorily, they were constituted of a relatively large number of individual or separate pieces, and some of the parts (including the hook formations) were rather complicated and critical as to their formation and manufacture. Accordingly, the cost of producing the fastening devices were relatively great and in fact disproportionate with respect to the intended use. If, as was mostly the case, the fastening devices were intended to accomplish a permanent securement of panels, it was found to be especially undesirable to have costly and complicated components.

Another advantage of prior fastening devices intended to secure panels to each other resided in the bearing arrangement for the rotatable parts. When the hook formations were subjected to considerable working stresses, the bearing means or shafts, even though bushed, would fail or malfunction. In some cases the shafts would seize in the bushings and cause the latter to rotate, whereby the supporting areas of the panel became chewed up, misaligned and disfigured. Where such surfaces were exposed to view this resulted in an unacceptable installation.

SUMMARY

The above drawbacks and disadvantages or prior eccentric-operated hook-type fastener devices are obviated by the present invention, which has for one object the provision of an improved fastener of this type, which has a sturdy and reliable bearing arrangement adapted to withstand considerable strains and loads to which the fastener is subjected, and wherein the fastener is constituted of fewer parts that are of simple and more economical construction while at the same time retaining the necessary integrity and reliability. Another object of the invention is to provide an improved, eccentric hook-type fastener as above characterized, which is smoother acting and less likely to bind during its latch-up operation. These objects are accomplished by the provision of a hook member constituted of heavy wire or wire-like stock, having essentially the configuration of the number 6, either with or without a curved vertical side portion connecting the upper hook extremity or bill to the lower, circular ring-like bearing or swivel part. Such a hook shape can be very easily and economically fabricated by known methods and with conventional tooling, as for example with the use of a four-slide machine. For cooperation with the simply-configured hook there is also provided an integral or all one-piece molded plastic member comprising an eccentric disk portion and integral guiding and shoulder formations which replace the prior multi-part eccentric type actuator heretofore utilized and fabricated of metal. This one-piece plastic eccentric member is so arranged that it can be very economically molded, and in conjunction with the "FIG. 6" configuration of the hook results in an extremely simple assemblage which enables a greatly reduced fabrication cost to be had. In addition, the specific formation of the circular or lower bearing portion of the hook minimizes any tendency for binding during turning movements of the eccentric actuator. If a bend is provided in the upright or side portion of the hook, this will allow the latter to slightly spring to a more open shape, during the fastening operation, thereby minimizing the need for critical tolerances and resulting in a smoother and easier operation of the fastener. For cooperation with the one-piece plastic eccentric member there are especially constructed, sturdy metal bearing strips which have extruded or drifted apertures so as to present large surfaces to the bearing portions of the eccentric member, and which adequately take care of all working stresses to which the fastener may be subjected.

Still other features and advantages of the invention reside in the provision of an improved eccentric-hook-type fastener as above outlined, which may be readily installed in recesses in the edge portions of panel structures; and a fastener of the type indicated, which is sturdy and reliable in its operation, and which will not require servicing or be subject to failure in spite of usage under adverse conditions and in difficult environments.

Still other features and advantages will hereinafter appear.

In the drawings which are illustrative of several embodiments of the invention:

FIG. 1 is a fragmentary side elevational view of portions of two adjoining panels having their edges secured together by the improved fastening device of the present invention. The fastening device is shown in broken outline.

FIG. 2 is a view like that of FIG. 1 but showing the panels in vertical section and showing the fastening device in side elevation.

FIG. 3 is a side elevational view of the fastening device in partially released position.

FIG. 4 is a side elevational view of the fastening device in fully released position, this view also showing the two adjoining panel portions in vertical section.

FIG. 5 is a transverse sectional view taken on the line 5—5 of FIG. 4.

FIG. 6 is a horizontal sectional view taken on the line 6—6 of FIG. 2.

FIG. 7 is an exploded perspective view of one form of shaft and bearing assemblage of the fastening device.

FIG. 8 is a front elevational view illustrating a modified form of the invention, comprising a fastening device having increased resilience or springyness.

FIG. 9 is a perspective view of a wire hook formation and connector bushing, and also of a latch bar adaptable for use with a plurality of eccentric actuators of the type provided by the invention.

FIG. 10 is a side elevational view of an eccentric, molded one-piece actuator for use either in left and right hand sets with the double hook configuration illustrated in FIG. 9 or else by itself with the single hook configurations of FIGS. 1–8.

FIG. 11 is a top plan view of the actuator of FIG. 10, with a section of the hook member being shown, taken on line 11—11 of FIG. 10.

FIG. 12 is a front elevational view illustrating yet another modified form of the invention, comprising a fastening hook having still more resilience than the hooks of FIGS. 1–6, 8 and 9, without resorting to notching of any hook portions.

FIG. 13 is a representation like that of FIG. 4, constituting a side elevational view of a modified fastening device in the fully released position, this view also showing two adjoining panel portions in vertical section and illustrating in side elevation the bearing and mounting frame of the fastener.

FIG. 14 is a side elevational view of an assemblage of hook member and molded plastic eccentric disk, as utilized in the fastener of FIG. 13.

FIG. 15 is a side elevational view of the eccentric disk by itself.

FIG. 16 is a section taken on the line 16—16 of FIG. 15.

FIG. 17 is an opposite side elevational view of the eccentric disk as compared with FIG. 15.

FIG. 18 is an edge elevational view of one of the metal bearing strips of the bearing and mounting assemblage of the fastener.

FIG. 19 is a fragmentary side elevational view of a hook-type fastener assemblage constituting yet another embodiment of the invention.

Considering FIGS. 1–7 there is illustrated a pair of fastened panel portions 20, 22 arranged with their adjoining edges 24, 26 in abutting relation. The panel 20 has a cut-out or recess 28 in its edge 24, and the panel 22 has a recess 30 which is aligned with the recess 28. Disposed in the recess 30 of the panel 22 and carried by the opposite vertical walls of the recess in a cross bar 32 (hereinafter also termed a latching bar) arranged to be cooperable with a spring-action or resilient hook member 34 which is preferably formed of very heavy or thick wire. As seen in FIG. 4, in accordance with the present invention the hook member 34 has a configuration which is very much like the FIG. "6". A modified form of spring-action hook member 34a is illustrated in FIG. 8, and such modified form is also seen to have a configuration like the number "6". It will be understood that this specific configuration is an especially simple one, whereby the hook can be readily fabricated of heavy metal wire stock, on conventional equipment such as a four-slide machine or the like, using conventional tooling.

The hook member 34 has at one extremity a bill portion 36 and has its other end portion formed to provide a resilient circular bearing designated by the numeral 38. Although the hook member 34 is formed of heavy wire stock it is resilient, and yieldable when subjected to strong forces. For this purpose it may be suitably heat-treated, or else formed of a metal which is semi-hard such a spring wire stock of the type capable of being bent. The slight yieldability or resilience of the hook member 34 is such that the bearing or eye portion 38 can be sprung a slight extent in response to sufficiently powerful forces which may be exerted against the bill portion 36 of the hook, and this action will be explained below in greater detail.

In accordance with the present invention, for cooperation with the hook member 34 there is provided a molded one-piece actuator part or member designated generally by the numeral 40. The actuator member 40 is so constituted that it can be readily molded in simple cavities, and withdrawn therefrom without requiring special mold slides, inserts or the like. As seen in FIGS. 2–5 the actuator member 40 comprises a disk portion 42 which is adapted to closely fit into the circular bearing portion 38 of the hook member 34. Extending partially around and spaced from the disk portion 42 is a retainer flange and stop shoulder portion 44 having end abutment surfaces 46 and 48. The portion 44 is connected to the disk portion 42 by an arcuate connector or web portion 50, and such web portion is circular or continuous, extending alongside the circular bearing 38 of the hook member 34 at locations opposite the retainer portion 44 as seen in FIGS. 2 and 4.

Preferably, as seen in FIG. 5, the space between the disk portion 42 and the retainer portion 44 is of somewhat circular cross sectional shape, having slight undercuts or undercut side walls whereby the bearing portion 38 of the hook member can be snapped into the groove formed thereby and retained therein against accidental removal. Various types of plastic materials may be used to mold the actuator member 40, such materials having the yieldable property necessary to enable the molding of a slight undercut wall configuration such as is illustrated in FIG. 5, without requiring complicated mold shapes. Instead, the hot plastic before becoming fully set, can be stripped from the molds and will retain or regain the given undercut wall configuration, thereby to hold captive the bearing portion 38 of the hook 34, as will now be readily understood. With such construction the hook member 34, having once been snapped in place the plastic actuator 40, will be retained therein, and can have limited turning movement as allowed by engagement with the abutment walls 46, 48 of the guide and stop member portion 44.

Eccentrically disposed in the disk portion 42 of the one-piece plastic actuator is a through opening 52 of non-circular configuration, here shown as being square. For accommodation in the eccentrically disposed opening 52 there is provided a hollow shaft 54 of square cross sectional shape, adapted at portions intermediate the ends thereof to closely fit the opening 52. Bearing bushings 56 and 57 are provided, adapted to fit over end portions of the actuator shaft 54, the bushings 56 and 57 being cylindrical and having a fairly tight press-fit on the shaft 54. Preferably, as seen in FIG. 7, corner portions of the shaft 54 at both ends are relieved or flatted as indicated at 58, to improve the fit between the shaft and the bushings 56, 57 and to permit relative turning therebetween. A slight amount of friction can exist between the bushings 56, 57 and the shaft 54 so that the latter will remain in any of different rotative positions in which it is placed.

By virtue of the square cross section of the shaft 54 it has a keying connection with the eccentric disk portion 42 of the plastic actuator 40. Considering FIG. 6, in the assembly of the fastener device the bushing 57 can first be press-fitted into a suitable bore 60 in the side wall of the recess 28 of the panel 20. Thereafter, the hook member 34 which has been preassembled to the actuator 40, can be positioned in the recess 28 and the shaft 54 then passed through the opening 52 of the actuator, being started from the bottom when viewing FIG. 6. The opposite side wall of the recess 28 has a bore 52 which is aligned with the bore 60 and through which the shaft 54 is passed during the above assembly operation. Finally, the lower bushing 56 can be forced into the bore 62 of the panel 20, thereby completing the assembly of the fastener.

Operation of the device can now be readily understood. Starting from an unhooked position as illustrated in FIG. 4, and with a square-ended key inserted in the end of the shaft 54, the latter will be turned clockwise. This will swing the hook member 34 in a clockwise direction due to the friction between the hook member and the plastic actuator, and the bill portion 36 of the hook will swing downward past the latching bar 32 carried by the panel 22. As the bill 36 completes its downward movement, the cross or latching bar 32 will be engaged by the straight portion of the hook member 34. Thereafter, continued movement or turning of the key which drives the shaft 54 in a clockwise direction will cause the eccentric disk portion 42 to continue its clockwise turning while the hook 34 now remains stationary. Due to the eccentric disposition of the disk 42, the hook 34 will now be shifted from right to left until a dead center position is reached. This will forcibly pull together the panels 20, 22, and the hook member 24 can now yield slightly, particularly at the bearing portion 38 thereof, as the panel edges are brought up tight against each other. A slight additional movement of the plastic actuator 40 is possible, past the dead center position to the locking position illustrated in FIG. 2. For such position, the abutting edge 48 will come to rest against the hook member 34 and the fastener will now be locked in its latching position. Unlocking or loosening of the fastener is effected by merely reversing the turning force applied to the shaft 54, by use of the key or tool (not shown) having the square shank.

If it is desired that the hook member 64 have a greater yieldability, a configuration as illustrated in FIG. 8 can be employed wherein a hook member 34a has a curved or bowed vertical connector portion 64 extending between the bill portion 36a and the bearing portion 38a. It will be understood that by virtue of such curvature, the hook member 34a can yield to a slightly greater extent, as compared with the hook configuration 34.

In place of a single hook configuration such as that indicated at 34, a double hook configuration can be utilized, as illustrated in FIG. 9. In this figure the cross or latching bar is indicated at 68, said bar being engageable by bill portions 70, 72 of a hook member designated generally by the numeral 74. The bill portions 70, 72 are interconnected by a cross bar or member 76, and are carried by curved portions 78, 80 respectively of the hook member. The portions 78, 80 terminate in circular bearing portions 82, 84 respectively and such portions may be carried by one-piece plastic actuator members such as the member 40 described above; or the bearing portions 82, 84 can be carried by a different-shaped one-piece plastic actuator 87 constituting a modified form of the invention as illustrated in FIGS. 10 and 11. For such actuator, there is provided a connector bushing or spacer 86 as illustrated in FIG. 9.

The eccentric actuator 87 of FIG. 10 comprises a central disk portion 88 provided on its opposite sides with a pair of hubs 90, 92. Through the hubs 90, 92 and the disk portion 88 there is a non-circular opening or bore 94, shown herein as having a hexagonal configuration. It will be noted that the hub portions 90, 92 are eccentrically disposed with respect to the disk 88, to such an extent that there exists a space 96 between corresponding peripheral portions of the hubs, FIG. 11. Extending around the disk 88 is a circular flange 98 having along a portion of its periphery an upwardly curled edge 100. The arrangement is such that the disk 88 can be received in the bearing portion 38 of the hook member 34 as illustrated in FIG. 11. Since a portion of the bearing 38 of the hook will occupy the space 96 between the hubs 90, 92, the hook 34 will be held captive particularly if a close fit exists between the bearing 38 and the disk 88. Also, the latter may be molded with a slight bead 102 to enhance the retention of the bearing portion 38 of the hook 34 on the plastic actuator 87.

The flange 98 is extended beyond the bearing portion 38 of the hook 34, and has an upstanding wall or shoulder 104 provided with end surfaces 106 and 108 which are engageable with the hook member 34 and function in the manner of the end surfaces 46, 48 of the actuator member 40 as already described previously. That is, when relative turning occurs between the actuator member 87 and the hook member 34, one or the other of the abutting surfaces 106, 108 can engage the hook to apply a driving force thereto, either for the purpose of causing engagement of the hook with the cooperable latch bar or else causing disengagement of the hook therewith.

Referring to FIG. 9, two actuator members (left hand and right hand) like the actuator 87 can be utilized with the double hook formation 74, such actuator members being coupled together by the coupling bushing 86 which will fit over the two nearest hubs 90 or 92 of the members. In this circumstance, left hand and right hand actuator members are preferably provided. That is, the actuator member 87 illustrated in FIG. 10 can be utilized with the bearing 82 of the compound hook 74, and a similar actuator member constructed to be a mirror image or opposite of the member 87 can be utilized for engagement with the circular bearing portion 84 of the compound hook. The two hubs which are not coupled by the bushing 86 will be disposed in suitable bearing openings in the walls of the recess provided in the panelled edge, somewhat in the manner illustrated in FIG. 6.

If but a single plastic actuator member 87 is employed with the hook 34, the hubs 90, 92 will replace the bushings 57, 56 respectively as shown in FIG. 6, with the actuator 40 being replaced by the actuator 87. In such circumstance, one wall of the panel would be removably secured in place, preferably. The driving tool for latching or unlatching the fastener will have a hex end in the manner of an Allen wrench.

The hook 34 can be quite thick and stiff, so as to effect a very tight pull-up of the panels 20, 22 while permitting the disk 42 to be turned clockwise past dead center to the locked-up position shown in FIGS. 1 and 2. A softer action can be had by providing notches 38b in the eye-portion 38, to enable the portion 38 to yield more readily. Or, as an alternative, the hook 34 can be made of thinner wire than that shown, and the notches 38b omitted.

In FIGS. 1 and 2 the showing of the disk 42 position as shifted clockwise past dead center is exaggerated. Actually the locked-up position of the disk 42 could be 65° rotated counterclockwise from the illustrated position of FIGS. 1 and 2 of approximately 80° past dead center, making it approximately only 15° past dead center. It will be understood that for such actual, lesser lock-up position past dead center, less spring is required of the hook 34.

Still another form of springy hook having increased yieldability without resorting to notching is shown in FIG. 12. The hook 34c illustrated therein comprises a more distinct or sharper angle-shaped connector portion 110 extending between the bill 36c and the swivel or bearing 38c. The cross bar for cooperation with the hook 34c is labelled 32c. The hook of FIG. 12 still has a shape resembling the FIG. 6, but is now characterized by a somewhat overhanging or extended top portion. This particular configuration has been found to possess excellent spring properties which especially adapt it for use in fasteners of the kind illustrated herein, since the portions 38c and 32c can be readily sprung apart, returning to their original positions upon removal of the distorting force.

Another embodiment of the invention, utilizing the L-shaped hook formation 34c of FIG. 12, is illustrated in FIGS. 13–18. In these figures, two panel portions 112, 114 are shown, having cut-outs or recesses 116, 118 respectively. In the panel portion 114 a cross pin 32c is provided, occupying the recess 118 in the location indicated.

The hook member 34c, having connector portion 110, bearing portion 38c and bill portion 36c is carried by an eccentric disk 120 which is constituted of molded plastic, and which has integral means for eccentrically mounting the disk, said means comprising oppositely disposed bearing hubs 122 and 124. The disk 120 is adapted to occupy the circular bearing portion 38c of the hook 34c, and is provided with a circular flange 126 against which the hook bearing portion rests. A circular guide portion 128 is integral with the flange 126 and extends along outer surfaces of the circular bearing portion 38c of the hook member 34c.

Detent shoulder means are provided on the disk 120, to retain the bearing portion 38c of the hook member on the eccentric disk 120, in accordance with the circular flange 126. Such detent means comprises a circular or annular shoulder 130 disposed along one edge of the disk 120. A slight interference fit is provided by the detent shoulder 130, whereby the circular portion 38c of the hook member is required to be sprung slightly in fitting it around the disk 120.

It will be noted that the hubs 122, 124 have spaced apart portions designated respectively 132, 134 which project beyond the periphery of the disk 120 at a location diametrically opposite the circular guide portion 128. In assembling the hook member 34c to the eccentric disk, the circular bearing portion 38c is first fitted between the spaced apart portions 132, 134 of the hubs 122, 124, and thereafter the bearing portion is forced around the disk 120. In so doing, the bearing portion 38c springs open slightly, and also the guide portion 128 of the molded disk 120 yields slightly in order to enable the portion 38c to be forced past the detent shoulder 130. By proper selection of tolerances and dimensions, this assembly operation may be quickly and easily effected, without difficulty.

The disk 120 is provided with means engageable by a tool, to effect its turning. Such means comprises a non-round socket or bore 136, shown in FIGS. 14–17 as being hexagonal whereby it can accommodate an Allen wrench.

The plastic disk 120 with the hubs 122, 124, circular flange 126 and guide portion 128 can be readily molded all in one piece, of suitable strong, somewhat resilient plastic material as for example nylon or other strong substance.

By the present invention the eccentric disk 120 is carried in a bearing assemblage comprising a pair of spaced-apart, metal mounting and bearing strips 138, 140 which are identical to each other. The bearing strip 138 comprises an elongate body portion 142 having a bearing opening or aperture 144 the edges of which are drifted as indicated at 146 to provide a larger bearing surface. As seen in FIG. 16, the drifted bearing aperture 144 turnably receives the hub 124 of the eccentric disk 120. In like manner, the drifted bearing aperture of the companion metal bearing strip 140 receives the opposite bearing hub 122 of the disk 120.

End portions of the bearing strips 138, 140 have inwardly offset portions. In FIGS. 13 and 18 the end portions 148 of the strip 142 are shown as off-set, and said portions are secured to each other by rivets 150, with the eccentric 120 disposed between the strips and having a bearing by means of the hubs 122, 124 being turnable in the drifted bearing apertures of the strips. Also, the offset portions 148 of the bearing strip 138 have mounting apertures 152 by which the assemblage of bearing strips, eccentric disk and hook member can be secured in place in the recess 116 of the panel portion 112 as illustrated in FIG. 13.

The circular guide portion 128 has driving shoulders 154, 156 for engagement with the connector portion 110 of the hook member 34c. As seen in FIGS. 13 and 14, the shoulder 154 is engaged with the connector portion 110 for the retracted position of the hook member. In operation, the fastener is brought to the operative condition by inserting an Allen wrench in the socket 136 of the disk 120, said wrench being passed through suitable openings (not shown) in the panel 112. By means of the Allen wrench, the disk 120 as viewed in FIGS. 13–15 is turned in a clockwise direction. Due to the friction existing between the disk and the hook member, the latter will also be turned in a clockwise direction until it engages the cross pin 32c. This is illustrated by the broken outline in FIG. 13. Continued turning of the eccentric disk 120 will now result in the driving shoulder 156 engaging the opposite side wall of the connector portion 110 of the hook member, whereupon the latter will be forcibly held against the cross pin 32c. As the disk 120 is turned further, it will be shifted past its dead center position, locking the hook member 34c to the cross pin 32c. In passing the dead center position, the hook member 34c will be stressed and slightly straightened within its elastic limit, as will be readily understood.

The releasing operation of the fastener is effected in a similar manner, by inserting the Allen wrench in the socket 136 and turning in a counterclockwise direction as viewed in FIGS. 13–15.

It will be appreciated that in conjunction with the one-piece plastic eccentric member, the provision of the metal bearing and mounting cage comprising the strips 138, 140 constitutes a sturdy support for the fastener. Under normal working stresses, the metal strips having the bearing portions 146 securely turnably mount the eccentric disk so that no failure of the bearings of the fastener can occur. By securing the metal disks 138–140 at their extremities to the panel 112 a strong support is provided for the entire fastener. Such securement can be effected by suitable screws and washers (not shown). Accordingly, it is seen that the embodiment of the invention illustrated in FIGS. 13–16 is especially sturdy and rugged, and constitutes a distinct and important improvement in fasteners of this type.

Yet another embodiment of the invention is illustrated in FIG. 19, which can be likened to FIG. 14. In FIG. 19 the bearing portion 38c of the hook member 34c is retained on the eccentric disk 120a in a positive manner by an extra retainer part. As shown, there is provided a retainer washer or plate 160 which fits against the non-flanged side of the disk 120a and is secured thereto. The retainer plate 160 has a large aperture 162 to receive the hub 124a of the eccentric, and is secured to the disk 120a by rivets 164 passing through both the plate and the disk. The periphery of the plate 160 is sufficiently large in diameter that it engages one side of the bearing portion 38c of the hook 34c, thereby to hold the bearing portion against the flange 126a of the disk and block removal of the hook from the eccentric. Preferably the plate 160 is not so large as to overlie the guide and stop portion 128a of the disk, however. Otherwise the constructions of FIGS. 14 and 19 are in general similar. The assemblage of FIG. 19 constitutes a fastener unit which represents an operative entity complete in and of itself and therefore capable of use in a large variety of situations.

It will now be understood from the foregoing that I have provided a novel and improved eccentric hook-type fastener device which has relatively few parts that can be inexpensively produced and assembled. The hook formation is especially simple in its configuration and can be easily and quickly formed with the desired resiliency controlled by the amount of curvature imparted to it. The plastic actuator, constituted as a single piece molding, can be economically produced in large volume from molds having simple cavities, and is much less costly than multi-part actuators heretofore provided for this type of fastener.

Variations and modifications are possible without departing from the spirit of the invention.

I claim:

1. A hook-type tensile fastening device for securing together two adjoining structures comprising, in combination:
   a. a base member,
   b. a resilient, hook member constituted of round metal wire and having substantially the configuration of the FIG. "6",
   c. said hook member including at one end a bent, substantially circular bearing portion of relatively large diameter, including at its other end a bent bill portion, and including a connector portion extending between said bearing and bill portions,
   d. the bends at the bill and bearing portions being in the same general directions and towards each other,
   e. a one-piece, molded plastic disk disposed in the bearing portion of the hook member and turnable therein, and
   f. means eccentrically mounting the disk on the base for turning movement thereon about an axis parallel to and non-coincidental with the axis of the disk,
   g. said disk having a circular flange integral with and extending along peripheral portions of the disk at one side thereof,
   h. the flange of the disk having a circular guide portion on and integral with it and engageable with outer areas of the bearing portion of the hook member, said circular guide portion being spaced from the periphery of the disk and forming therewith an annular groove having a mouth at the other side of the disk, through which the circular bearing portion of the hook member can be passed,
   i. said circular bearing portion riding in said groove when the disk is turned with respect to the hook member.

2. A fastener as in claim 1, wherein:
   a. the circular guide portion has stop shoulders adapted to engage opposite sides of the hook member to effect a driving connection thereto.

3. A fastener as in claim 1, wherein:
   a. the disk has detent shoulder means integral therewith, engageable with the bearing portion of the hook member to retain said bearing portion on the disk.

4. A fastener as in claim 3, wherein:
   a. the circular guide portion of the flange has detent shoulder means integral therewith, engageable with the bearing portion of the hook member to retain said bearing portion on the disk.

5. A fastener as in claim 1 and further including:
   a. a retainer plate secured to the other side of the disk and extending beyond peripheral portions of the disk,
   b. said retainer plate overlying the circular bearing portion of the hook to retain the same on the disk.

6. A fastener as in claim 1, wherein:
   a. the circular guide portion of the disk has undercut walls, producing a groove whose mouth is of reduced width.

7. A fastener as in claim 1, wherein:
   a. the means for eccentrically mounting the disk comprises hubs disposed on opposite sides of the disk and molded integral therewith, b. said hubs being eccentrically disposed with respect to the disk and having spaced-apart portions located beyond the periphery of the disk,
c. the bearing portion of the hook member being received in the space between the hubs.

8. A fastening device as in claim 1 wherein:

a. the connector portion of the hook member is bowed and capable of being slightly straightened in response to the application of opposing forces to the bearing and bill portions thereof respectively.

* * * * *